United States Patent [19]
Drover

[11] Patent Number: 5,992,343
[45] Date of Patent: Nov. 30, 1999

[54] PARKING ASSISTANCE DEVICE

[76] Inventor: Glenn Frank Drover, 17 Crooked Pond Dr., Hilton Head, S.C. 29926

[21] Appl. No.: 09/083,064

[22] Filed: May 21, 1998

[51] Int. Cl.[6] ....................................................... G01B 5/24
[52] U.S. Cl. .............................. 116/28 R; 33/286; 33/288
[58] Field of Search ................................ 116/28 R, 35 R; 33/264, 286, 288, 600, 227, 228, 276, 277, 278

[56] References Cited

U.S. PATENT DOCUMENTS

| | | |
|---|---|---|
| 4,036,165 | 7/1977 | Wood . |
| 4,433,636 | 2/1984 | Crouch ................... 116/28 R |
| 4,583,481 | 4/1986 | Garrison . |
| 4,621,432 | 11/1986 | Law . |
| 4,813,758 | 3/1989 | Sanders ................... 116/28 R |
| 4,941,263 | 7/1990 | Hirshberg . |
| 5,230,296 | 7/1993 | Giltz et al. . |
| 5,231,392 | 7/1993 | Gust . |
| 5,315,953 | 5/1994 | Mullarkey, Jr. . |
| 5,474,016 | 12/1995 | Haney . |
| 5,655,474 | 8/1997 | Pretsch, Jr. . |

FOREIGN PATENT DOCUMENTS

| | | | |
|---|---|---|---|
| 372014 | 3/1923 | Germany ................................. 33/286 |
| 567714 | 10/1957 | Italy ......................................... 33/264 |
| 2188147 | 9/1987 | United Kingdom ..................... 33/286 |

*Primary Examiner*—Andrew Hirshfeld
*Attorney, Agent, or Firm*—Harleston Law Firm; Kathleen M. Harleston

[57] ABSTRACT

A device for assisting a driver in the parking of a vehicle in a sheltered parking space is provided. The device includes: (a) an upper horizontal bar; (b) two parallel vertical bars, front and rear, which extend down from and are each attached at one end to the upper horizontal bar; and (c) two parallel horizontal bars, front and rear. The rear horizontal bar attaches at approximately a right angle to the rear vertical bar. The device is suspended over and in front of the parking space, such that when a person in the driver's seat of a correctly parked car in the parking space views the device, the front vertical bar is directly in front of the rear vertical bar, and the front horizontal bar is directly in front of the rear horizontal bar.

7 Claims, 4 Drawing Sheets

5,992,343

PARKING ASSISTANCE DEVICE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Technical Field

The present device is a device for assisting a driver in parking a vehicle in a vehicle shelter. More particularly, a driver can pull an automobile or other vehicle into proper parking position in a parking space in a garage or carport by visually spot checking this device, which remains affixed to the ceiling or other wall of the vehicle shelter.

2. Background Information

It seems to be the nature of man to accumulate goods. Homeowners therefore seem to be on a perennial quest for storage space. A favorite location for storing the accumulation of goods, including bicycles, lawn mowers, and boxes of holiday decorations, is the garage. With minimal space left in the carport or garage for the family vehicle(s), fitting the car in the garage without damaging the car, the goods, or the garage can be a problem. The problem is more severe for certain garages and for certain drivers. In some garages, particularly those which are built adjacent to newer houses, the garage door will not close behind the car unless the front of the car is in close proximity to the garage wall. Particularly in some allegedly two-car garages, the inconvenience is so great that one or both drivers often elect to leave the car outside the garage.

The problem also exists in carports or garages which accommodate multiple vehicles. Often apartment complexes, for example, will have one long carport with a parking space for each apartment. In shelters for multiple vehicles, the problem is exaggerated by increased traffic into and out of the parking spaces and by the possibility that the car being parked ineptly may strike the car, wall, or pole on either side of the parking space.

Homeowners and renters have devised many creative but often insufficient remedies for this problem. For example, some homeowners employ a string with a tennis ball attached to the end. The string is suspended from the garage ceiling so that the tennis ball strikes the front windshield of the car when the car has rolled to the selected point. This homemade device indicates a stop line, but does not indicate whether the car has been parked in a slanted position in the parking space. Various barrier systems, guide systems, and distance gauges have attempted to address this problem.

BRIEF SUMMARY OF THE INVENTION

The present invention is a device for assisting a driver in the parking of a vehicle in a sheltered parking space. The device comprises: (a) an upper horizontal bar; (b) two parallel vertical bars, front and rear, which extend down from and are each attached at one end to the upper horizontal bar; and (c) two parallel horizontal bars, front and rear. The rear horizontal bar attaches at approximately a right angle to the rear vertical bar. The device is suspended over and in front of the parking space, such that when a person in the driver's seat of a correctly parked car in the parking space views the devices, the front vertical bar is directly in front of the rear vertical bar, and the front horizontal bar is directly in front of the rear horizontal bar.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
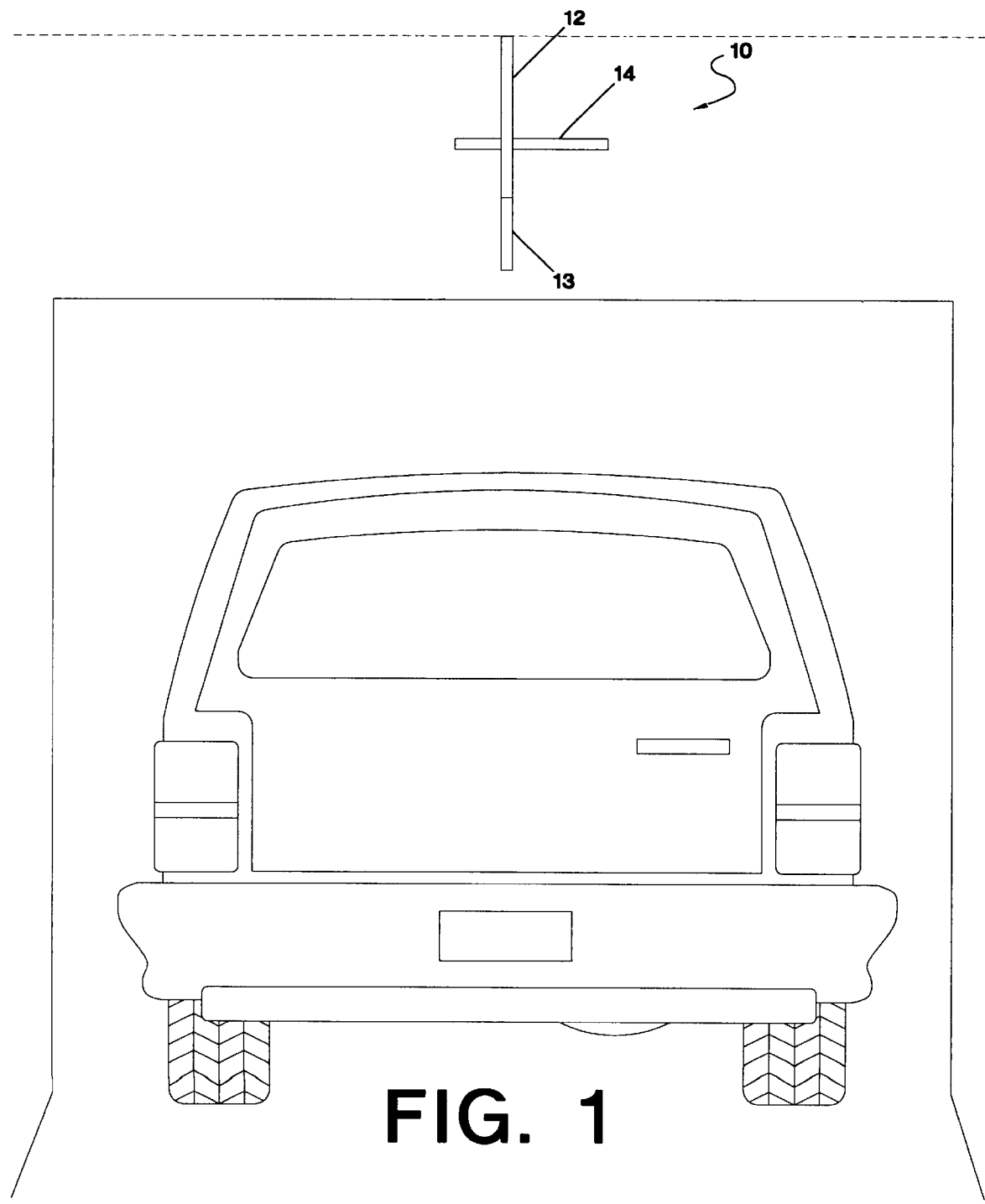
FIG. 1 shows a perspective view of a vehicle which has been correctly parked in a garage in alignment with a parking assistance device according to the present invention.

In the following description, like reference characters designate like or corresponding parts throughout the several views. Also, in the following description, it is to be understood that such terms as "front," "back," within," and the like are words of convenience and are not to be construed as limiting terms. Referring in more detail to the drawings, the invention will now be described.

Referring to FIG. 1, a parking assistance device 10 according to the present invention is shown affixed to the ceiling of a garage in front of a parked car. The device 10 is shown as it would appear to the driver once the car or other type of vehicle is correctly positioned in the parking spot in the garage or carport. This device is for assisting a driver in the parking of a vehicle, preferably an automobile, in a sheltered parking space, preferably a garage.

Figure 2:
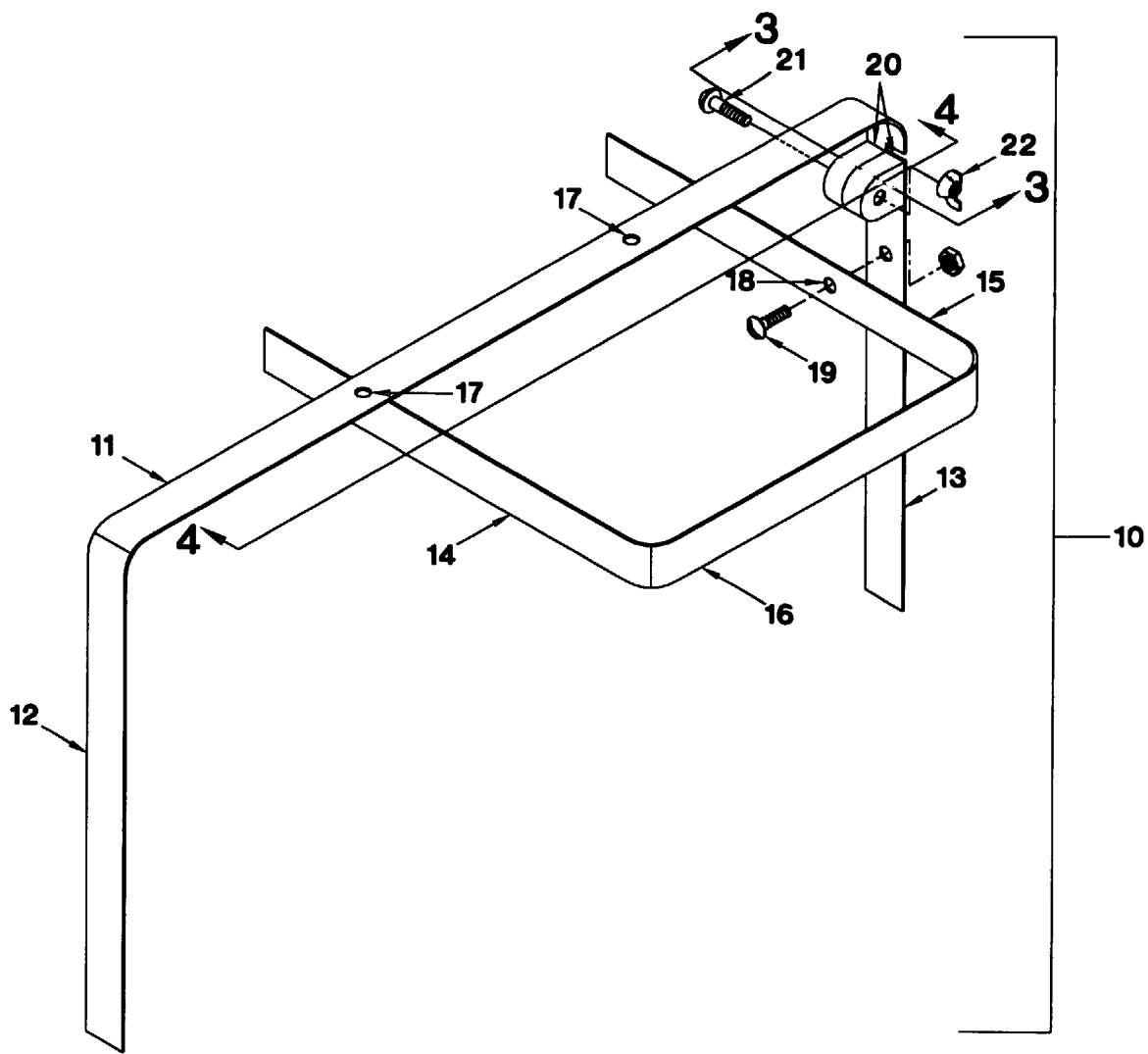
FIG. 2 is a perspective view of the device shown in FIG. 1.

Referring to FIGS. 1 and 2, the parking assistance device 10 comprises:

(a) an upper horizontal cross bar 11 with means for attaching the device to an elevated structure, preferably a ceiling or wall of a garage or carport;

(b) two parallel vertical bars, one front 12 and one rear 13, which extend down from and are each attached at one end to the upper horizontal cross bar 11; and (c) two parallel horizontal bars, one front 14 and one rear 15. In the preferred embodiment, the two parallel horizontal bars 14, 15 are also each connected to an opposite end of a bottom horizontal cross bar 16. The rear horizontal bar 15 attaches at approximately a right angle to the rear vertical bar 13.

As shown in FIG. 1, the device 10 is suspended over and in front of the parking space, such that when a person in the driver's seat of a correctly parked car in the parking space views the device 10, the rear vertical bar 13 is directly behind the front vertical bar 12, and the rear horizontal bar 15 is directly behind the front horizontal bar 14. Thus, when a driver is pulling a car into the parking space, one vertical bar 12 and one horizontal bar 14 are visible, as is shown in FIG. 1, except that a short segment of the rear vertical bar 13 appears directly below the front vertical bar 12. This indicates that the car is correctly aligned in the parking space, so that the front wheels of the car are at the stop line and are directly in front of the back wheels.

In a preferred embodiment, the present device can best be understood as being comprised of two principal parts: an upper bar and a lower bar. The end portions of each bar are bent down at approximately right angles to form three segments in each bar which are roughly equal in length. The upper bar is comprised of a slightly longer middle segment called the upper horizontal cross bar 11. The parallel vertical bars 12, 13 extend down from either end of the upper horizontal cross bar 11. The middle one third of the lower bar is the bottom horizontal cross bar 16. The parallel horizontal bars 14, 15 extend from either end of the bottom horizontal cross bar 16. The bars are preferably made of lightweight aluminum or plastic.

As shown in FIG. 2, the upper horizontal cross bar 11 comprises two holes 17 through which screws can be placed to affix the device to the elevated structure in the vehicle shelter. Other suitable means of attachment can be used in place of screws. Less preferably, the device 10 can be affixed to the upper part of the wall of the garage or carport which faces the front of the parked car.

Figure 3:
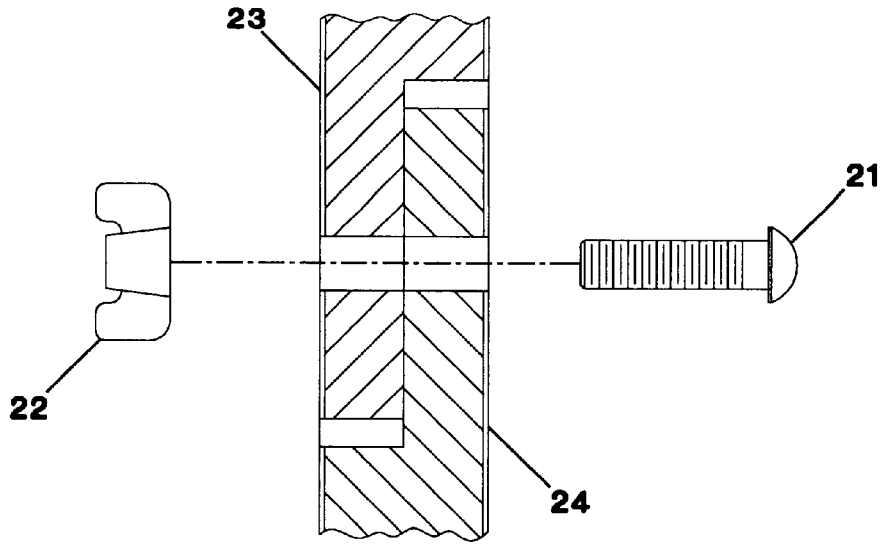
FIG. 3 is a sectional 3—3 of FIG. 2 showing the joint between upper and lower segments of the rear vertical bar.

The rear horizontal bar 15 and the rear vertical bar 13 each comprise a hole 18 through which a screw 19 is placed, with a nut, to secure the rear horizontal bar 15 to the device 10. Since the front horizontal bar 14 and the bottom horizontal cross bar 16 are adjacent to the rear horizontal bar 15, they are also suspended from the rear vertical bar 13. In the preferred embodiment shown in FIG. 2, the rear vertical bar 13 comprises a joint 20. The parts which meet at the joint are affixed to each other by means of a screw 21 and a wing nut 22. Referring to FIG. 3, the joint 20 is the conjunction of upper 23 and lower 24 segments of the rear vertical bar 13.

Initially, the user purchases the present parking assistance device and affixes it somewhat loosely to the ceiling of the vehicle shelter, which is usually a garage. The user positions the device 10 on the ceiling so that it is in front of the parking space and in the driver's field of vision as the driver pulls the car into the parking space in the garage. By trial and error, the user repositions the device so that the vertical and horizontal bars of the device 10 are aligned when viewed from the driver's seat of a car which is in the desired, parked position. Once the device 10 is in the correct alignment, as is shown in FIG. 1, the user tightens the screws and the device is ready for repeated use.

Figure 4:
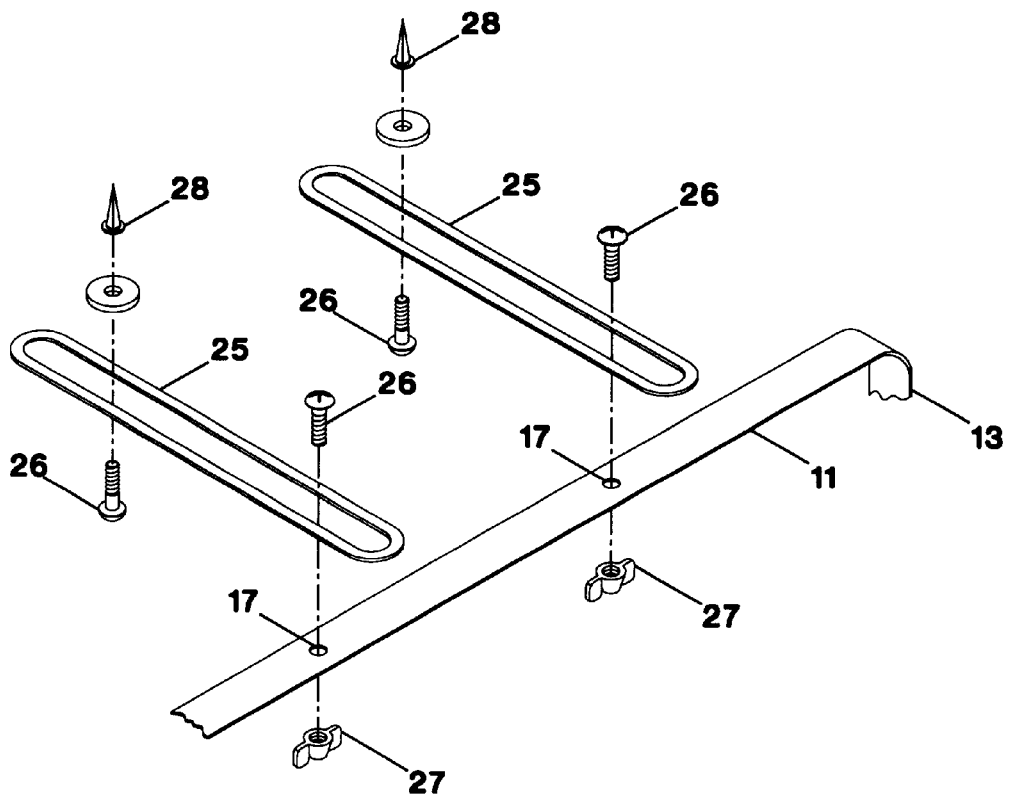
FIG. 4 is a sectional view 4—4 of FIG. 2, showing the means of attachment of the device to the garage ceiling.

Referring to FIG. 4, the preferred means of attachment of the device to the ceiling of the vehicle shelter is a set of brackets and screws. Two 4 to 8 inch long brackets 25 are attached to the upper horizontal cross bar 11 with screws 26 and wing nuts 27. One screw 26 is placed down through one end of the slot in each bracket and through each hole 17 in the upper horizontal cross bar 11. When the user wishes to adjust or readjust the device 10, he or she can use a step stool or other device to climb up to the device and loosen the wing nuts 27, then push the upper horizontal cross bar 11 along the bracket slots to the desired position, and tighten the wing nuts 27. In this manner, the device 10 can be brought into alignment. The parallel horizontal bars 14, 15 can be brought into alignment by loosening wing nut 22 and adjusting vertical bar 13.

The device is aligned so that the car will be straight in the space and at the proper stop line once the car is parked using the device. When the car is entering the space in an incorrect manner, the parallel bars will not appear to the driver to be in alignment. Depending upon how the bars of the device appear to the driver, he can make adjustments parking space. Thus, by employing both horizontal and vertical bars, the present device gives specific directions to the driver regarding whether to steer to the right or left on entering the garage, and how close he is to the stop line.

Figure 5:
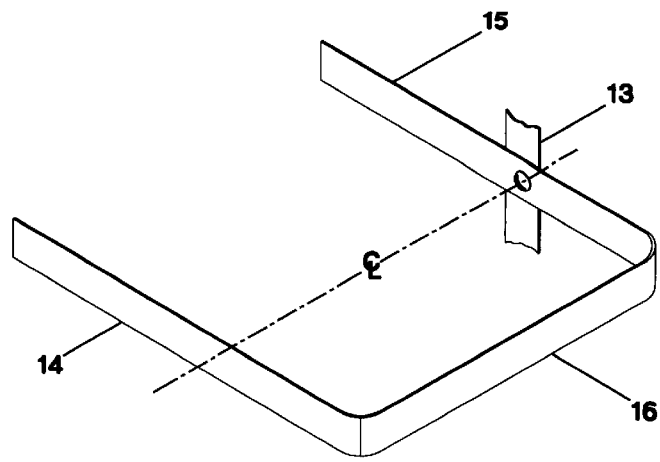
FIG. 5 is a partial perspective view of the device show n in FIG. 1.
Figure 6:
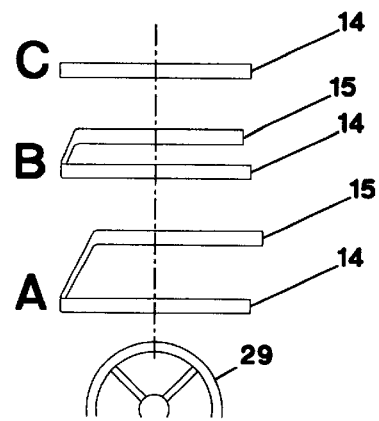
FIG. 6 is an elevational view of the parallel horizontal bars of the device of FIG. 5 along center line CL, where the bars are shown in three different positions as the vehicle approaches the device.
Figure 7:
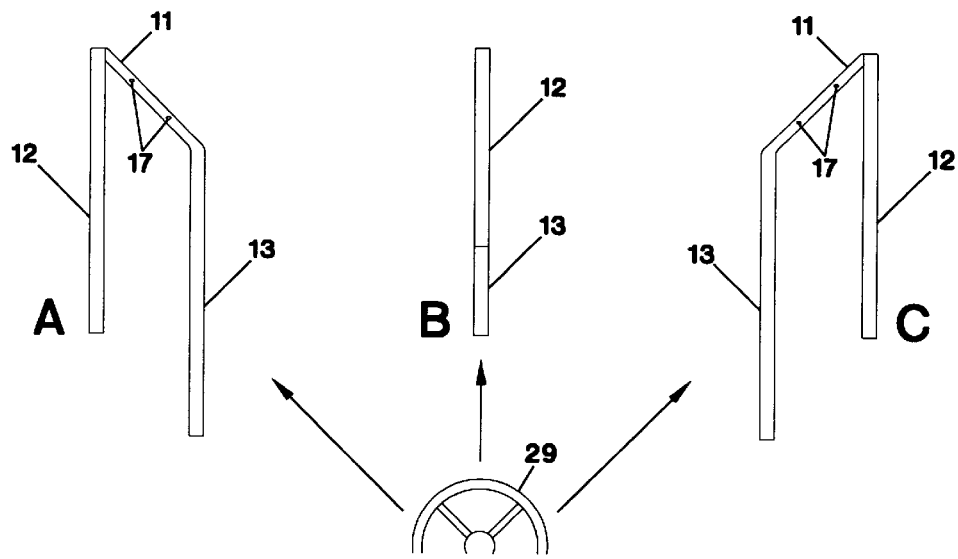
FIG. 7 is a elevational view of the parallel vertical bars of the device of FIG. 5 along center line CL, where the bars are shown in three alternate positions as the vehicle approaches the device.

FIGS 5–7 are included to show how the driver uses the device of the present invention to park the car in the garage. FIG. 5 is a perspective view of the device as seen from the front. It is provided to indicate line CL, which is the center line along which the driver views the device from the driver's seat.

FIGS. 6 and 7 show both correct and incorrect car positions from the vantage point of the driver at the steering wheel 29. For simplcity of explanation, FIG. 6 shows only the parallel horizontal bars 14, 15, and FIG. 7 shows the parallel vertical bars 12, 13 of the device. The horizontal bars indicate to the driver how close she is to the stop line in the parking space. The vertical bars indicate whether the car is entering the space at a right or left slant. In use, the device has both vertical and horizontal bars.

The front vertical bar 12 and the front horizontal bar 14 of the device are preferably one color, and the rear vertical bar 13 and the rear horizontal bar 15 are a contrasting color. More preferably, fluorescent colors, such as dayglo lime green in the front and dayglo orange in on the bars to improve visibility to the driver.

FIG. 6 shows three examples of sequential positions that the front (green) and rear (orange) horizontal bars 14, 15 might be in as the car approaches the parking space. Seen from the driver's vantage point along line CL, the bottom position, A, in FIG. 6 is where the front horizontal bar 14 is seen below the rear horizontal bar 15. For example, the green bar 14 appears to be distinctly below the orange bar 15. This occurs when the vehicle is about 5 feet from the selected stop line. The middle position, B, in FIG. 6 is where the front horizontal bar 14 is perceived as being closer to the rear horizontal bar 15. In other words, the green bar 14 appears to the driver to be just below the orange bar 15. This occurs when the vehicle is about 2 feet from the stop line in the parking space. The top position, C, in FIG. 6 is where the front horizontal bar 14 obscures the rear horizontal bar 15. In our example, the green bar 14 is the only one visible to the driver. This indicates that the vehicle is at the stop line in the parking space. At this point, the driver should stop the car.

FIG. 7 shows three alternative examples of positions that the front and rear vertical bars 12, 13 might appear in as the driver approaches the parking space. The parallel vertical bars 12, 13 are connected by the upper horizontal cross bar 11, which is affixed to the ceiling of the garage via screws inserted through holes 17 in the bar. Seen from the driver's vantage point along center line CL, the middle position, B, in FIG. 7 indicates that the car is straight in the parking space. In position B, the front vertical bar 12 obscures most of the rear vertical bar 13, except that a short segment of the rear vertical bar 13 is visible directly below the front vertical bar 12. The driver would see a longer green bar 12 on top and a short segment of orange bar 13 below and connected to the green bar 12.

Two incorrect approach positions are provided to the left and right of the middle position in FIG. 7. As viewed by the driver in position A, the vehicle is to the right of the center line. The front and rear vertical bars 12, 13 are both visible to the driver. The green bar 12 would appear to be to the left of the orange bar 13. This indicates to the driver that he should steer to his left in order to correctly align the car in the parking space.

As viewed by the driver in alternative position C in FIG. 7, the vehicle is to the left of the center line. The front and rear vertical bars 12, 13 are both visible to the driver. The green bar 12 would appear to be to the right of the orange bar 13. This indicates to the driver that she should steer to her right.

The present device is for assisting a driver in the parking of a vehicle in a parking space in a shelter having a ceiling surface. The device is preferably for parking a car in a sheltered parking space in a garage or carport. The present device is basically comprised of several, preferably two, aluminum-containing bars or rods or members which have been bent at two equidistant locations along each bar, forming three segments of approximately equal length in each bar. The present device comprises:

(a) an upper horizontal bar adapted to be movably secured to the ceiling surface by attachment means. The driver can change the position of the device on the ceiling by pushing the upper horizontal bar so that the device is in the desired position.

(b) ceiling surface attachment means for removably securing the device to the ceiling surface of the shelter, whereby the upper horizontal bar is positioned above and parallel to the parking space (i.e. one end of the upper horizontal bar is toward the car). The ceiling surface attachment means preferably comprises two brackets which are removably affixed to the ceiling surface in a position parallel to each other. The brackets are moveably affixed to the upper horizontal bar, preferably by means of screws and wing nuts, with one screw and wing nut for each bracket. The brackets are preferably affixed so that they are perpendicular (or transverse) to the upper horizontal bar.

(c) two parallel vertical bars, front and rear, which project down from and are each attached at one end to the upper horizontal bar; and (d) two parallel horizontal bars, front and rear, which are attached to each other by a bar extending from one end of each parallel horizontal bar; wherein the rear horizontal bar attaches at approximately a right angle to the rear vertical bar.

The device is adjustably suspended above and in front of the parking space, whereby when the driver sitting in a correctly parked car in the parking space views the device, the front vertical bar is directly in front of the rear vertical bar, and the front horizontal bar is directly in front of the rear horizontal bar. The device is preferably adjustably suspended from the ceiling surface in a position whereby the driver or operator of the vehicle may utilize the position of the suspended device to selectively park the vehicle in an appropriate, pre-selected position within the vehicle shelter. The position of the device may be adjusted before parking by the driver to suit his or her different needs, such as the height of the driver, or the particular car parking position preferred by that driver.

The present device preferably comprises:

(a) a vertical U-shaped rod (11, 12, 13) adapted to be movably secured at its mid-section to ceiling surface attachment means, the vertical U-shaped rod having a front vertical leg 12 and a rear vertical leg 13. Of course, in a U-shape, the legs are parallel to one another. The base 11 of the U-shape is preferably flat so that the base 11 plus the two legs 12, 13 form an open-ended square or box. The base 11 of the U is the "upper horizontal bar" 11 described above. While the legs of the U-shape extend vertically downward from the ceiling surface, the base of the U-shape is horizontal, or parallel to (and attaches to) the ceiling surface.

(b) ceiling surface attachment means 25–28 for removably securing the vertical U-shaped rod 11, 12, 13 to the ceiling surface of the shelter, whereby the front and rear vertical legs 12, 13 project downward, and whereby the vertical U-shaped rod is positioned above and parallel to the vehicle, with the front vertical leg 12 being closer to the vehicle than the rear vertical leg 13. By "parallel" is meant that the front vertical leg is closer to the car than the rear vertical leg, which is closer to the garage wall than the front vertical leg.

(c) a transverse U-shaped rod (14, 15, 16) which is slightly smaller than the vertical U-shaped rod 11, 12, 13, so that it can fit within the vertical U-shaped rod. The transverse U-shaped rod having a front transverse leg 14 and a rear transverse leg 15. The transverse U-shaped rod 14, 15, 16 is disposed transversely to the vertical U-shaped rod 11, 12, 13.

(d) transverse U-shaped rod attachment means 19 for removably attaching the rear transverse leg 15 to the rear vertical leg 13, whereby the front transverse leg 14 is closer to the front vertical leg 12 than the rear transverse leg 15, which is closer to the rear vertical leg 13. The rear vertical leg 13 preferably comprises an adjustable joint 20 which is above the point of attachment of the rear transverse leg 15 to the rear vertical leg 13, the adjustable joint 20 comprising removable joint attachment means 21 (screw), 22 (wing nut), whereby the driver can manipulate a lower end of the rear vertical leg 13 to adjust the position of the transverse U-shaped rod 14, 15, 16.

From the foregoing it can be realized that the described device of the present invention may be easily and conveniently utilized by a car driver to assist him in parking correctly in his garage or carport without mishap or multiple efforts. This device, which is preferably suspended from the ceiling of the garage or carport, helps a driver to park her car on a stop line and along a center line in her garage or carport.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. A device for assisting a driver in the parking of a vehicle in a parking space in a shelter having a ceiling surface, the device comprising:

(a) an upper horizontal bar;

(b) ceiling surface attachment means for removably securing the upper horizontal bar to the ceiling surface of the shelter, whereby the upper horizontal bar is movably affixable to the ceiling surface in a position which is above and parallel to the vehicle and the parking space;

(c) front and rear parallel vertical bars which project down from opposite ends of the upper horizontal bar;

(d) front and rear substantially parallel horizontal bars which are each connected to an opposite end of a bottom horizontal cross bar; wherein the rear horizontal bar attaches at approximately a right angle to the rear vertical bar, the front and rear horizontal bars being within a plane that is inclined with respect to the upper horizontal bar; and wherein the device is for adjustably suspending above and in front of the parking space, whereby when the driver is sitting in a correctly parked vehicle in the parking space, the front vertical bar will be directly in front of the rear vertical bar relative to the driver's point of view, and the front horizontal bar will be directly in front of the rear horizontal bar relative to the driver's point of view.

2. A device according to claim 1, wherein the front vertical bar and the front horizontal bar are one color, and the rear vertical bar and the rear horizontal bar are a contrasting color.

3. A device according to claim 1, wherein the ceiling surface attachment means comprise two brackets, each with a screw and bolt for attachment of the respective bracket to the ceiling surface, and a screw and wing nut for attachment of the upper horizontal bar to the brackets.

4. A device according to claim 3, wherein the rear vertical bar comprises an upper segment and a lower segment and an adjustable joint between the segments, and wherein the rear horizontal bar is affixed to the lower segment, such that the horizontal bars of the device can be aligned by loosening the joint and pivoting the lower segment with respect to the upper segment.

5. A device according to claim 1, wherein the upper horizontal bar is attached to and is capable of sliding along two brackets which are affixable to the ceiling surface of the shelter.

6. A device for assisting a driver in the parking of a vehicle in a shelter having a ceiling surface, the device comprising:

(a) a vertical U-shaped rod having a front vertical leg and a rear vertical leg;

(b) ceiling surface attachment means for removably securing the vertical U-shaped rod to the ceiling surface of the shelter, whereby the front and rear vertical legs project downward, and whereby the vertical U-shaped rod is positionable above and parallel to the vehicle, with the front vertical leg being closer to the vehicle than the rear vertical leg;

(c) a transverse substantially U-shaped rod which is smaller than the vertical U-shaped rod, the transverse U-shaped rod having a front transverse leg and a rear transverse leg, whereby the transverse U-shaped rod is disposed transversely to the vertical U-shaped rod; and (d) transverse U-shaped rod attachment means for removably attaching the rear transverse leg to the rear vertical leg, whereby the front transverse leg is closer to the front vertical leg than the rear transverse leg, which is closer to the rear vertical leg the transverse legs being within a plane that is inclined with respect to a plane through the vertical legs; and wherein the device is adjustably suspenable from the ceiling surface in a position whereby the driver of the vehicle may utilize the position of the suspended device to selectively park the vehicle in an appropriate, preselected position within the shelter.

7. A device according to claim 6, wherein the rear vertical leg comprises an adjustable joint above the point of attachment of the rear transverse leg to the rear vertical leg, the adjustable joint comprising removable joint attachment means whereby the driver can manipulate a lower end of the rear vertical leg to adjust the position of the transverse U-shaped rod.

\* \* \* \* \*